United States Patent
Hestetun (10) Patent No.: US 12,180,809 B2
(45) Date of Patent: Dec. 31, 2024

(54) 2-SLOT INLINE BLOCK MANIFOLD SYSTEM

(71) Applicant: Vetco Gray Scandinavia AS, Sandvika (NO)

(72) Inventor: Steinar Lindemann Hestetun, Billingstad (NO)

(73) Assignee: Vetco Gray Scandinavia AS, Sandvika (NO)

( * ) Notice: Subject to any disclaimer, the term of this patent is extended or adjusted under 35 U.S.C. 154(b) by 330 days.

(21) Appl. No.: 15/734,155

(22) PCT Filed: Aug. 2, 2019

(86) PCT No.: PCT/IB2019/056594
§ 371 (c)(1),
(2) Date: Dec. 1, 2020

(87) PCT Pub. No.: WO2019/234725
PCT Pub. Date: Dec. 12, 2019

(65) Prior Publication Data
US 2021/0215263 A1    Jul. 15, 2021

(30) Foreign Application Priority Data
Jun. 4, 2018   (NO) .................................. 20180762

(51) Int. Cl.
*E21B 43/017*   (2006.01)
*E21B 43/013*   (2006.01)
*F16K 27/00*   (2006.01)

(52) U.S. Cl.
CPC .......... *E21B 43/017* (2013.01); *E21B 43/013* (2013.01); *E21B 43/0175* (2020.05); *F16K 27/003* (2013.01)

(58) Field of Classification Search
CPC .......... Y10T 137/87877; F16K 27/003; F15B 13/0814; F15B 13/0842; E21B 43/0175; E21B 43/013
See application file for complete search history.

(56) References Cited

U.S. PATENT DOCUMENTS 3,709,248 A * 1/1973 Aurich .................... F16K 11/22
137/271
4,281,683 A * 8/1981 Hetherington .......... F16K 11/22
137/240

(Continued)

FOREIGN PATENT DOCUMENTS

CN        203703360 U  *  7/2014
WO        2012/101525 A1    8/2012

(Continued)

*Primary Examiner* — Kevin R Barss
(74) *Attorney, Agent, or Firm* — Baker Hughes Patent Organization (57) ABSTRACT

The present invention relates to a hub block (2) with two hubs (3a, 3b), each configured for connection with a branch pipe from a well. The two hubs are in line with each other. A flowline bore (12) extends between flowline inlet and exit ports (5, 10). The flowline bore (12) is intersecting and in fluid connection with two branch bores (23a, 23b) extending from the flowline bore (12) and to the hubs (3a, 3b). Two valve bores (11a, 11b) extend across the branch bores (23a, 23b). Furthermore the invention relates to a 2-slot inline block (1) with a hub block (2) and a manifold assembly of a plurality of 2-slot inline blocks (1).

11 Claims, 6 Drawing Sheets

(56) References Cited

U.S. PATENT DOCUMENTS

| | | | | |
|---|---|---|---|---|
| 4,874,008 | A | * | 10/1989 | Lawson .................. E21B 34/04 |
| | | | | 137/315.09 |
| 8,656,942 | B2 | * | 2/2014 | Wong .................... F16K 27/067 |
| | | | | 137/315.17 |
| 9,068,675 | B2 | * | 6/2015 | Mille ........................ F16L 1/18 |
| 2012/0181015 | A1 | | 7/2012 | Kajaria et al. |
| 2014/0064855 | A1 | | 3/2014 | Hammer et al. |
| 2017/0241243 | A1 | * | 8/2017 | Gomes Martins .. E21B 43/0175 |
| 2018/0030796 | A1 | | 2/2018 | Kalia et al. |

FOREIGN PATENT DOCUMENTS

| | | |
|---|---|---|
| WO | 2016/044910 A1 | 3/2016 |
| WO | 2017/174968 A1 | 10/2017 |

\* cited by examiner

2-SLOT INLINE BLOCK MANIFOLD SYSTEM

BACKGROUND

The present invention relates to a hub block, a 2-slot inline block, an assembly of a plurality of 2-slot inline blocks and an inline block manifold system. In particular the invention relates to a 2-slot inline block manifold system for installation on a pipeline conveying hydrocarbon fluids along the seabed.

A typical seabed pipeline laying procedure includes implementing a pipe laying vessel where sections of pipeline are welded together on-board the vessel. The vessel moves at constant speed while welding stations are moving along the vessel at the same speed as the pipeline.

Various elements, such as in-line tees (ILTs), valves etc. must sometimes be welded to the pipeline, and the vessel must then typically be stopped to allow time for installation.

At present cumbersome and complicated structures such as manifolds have a design that prevent installation on the pipeline in the pipeline sections assembly line. This is due both to the weight of the structure and to the large dimensions of a manifold, making it too wide to pass through the conveyors on the pipeline section assembly line. Larger structures such as manifolds are therefore connected to the pipeline structures on the seabed at a later stage. This entails the additional need for connecting spools and related equipment.

However, there is a constant request in the marked for solutions enabling improved efficiency during layout of a production field. There is also a need for simplified field solutions that combine simplicity with flexibility.

Furthermore, if the seabed of the oilfield is made of sand or mud, production equipment is placed on mud mats. Such mud mats are often placed on the seabed before or after lowering the equipment. It would be an advantage if elements installed on the pipeline could be secured to a mud mat during assembly on the vessel. This however is difficult due to the limitations in available space in the production line.

SUMMARY

It is thus a purpose of the present invention to provide a manifold system integrated on a pipeline at an assembly stage that allows at least two parallel branches to be installed while at the same time the manifold system is allowed to be installed and launched through the tensioner system and the stinger on the pipe lying vessel. Furthermore it is a purpose of the present invention to provide a compact system that is simple to adapt to specific needs, that include few parts, that is easy to stock, that is standardized, and that has few seals.

The present invention thus relates to an inline block manifold system including a plurality of hub blocks each comprising a first hub configured for connection with a branch pipe or jumper from a first well and a second hub configured for connection with a branch pipe or jumper from a second well, in line with and in an opposite direction of the first hub. A flowline bore, extend between a flowline inlet port and a flowline exit port, perpendicular to, and in fluid connection with a first branch bore extending from the flowline bore and to the first hub. A second branch bore extend from the flowline bore and to the second hub across the flowline bore. A first valve bore extend across the first branch bore, and a second valve bore extend across the second branch bore and wherein the flowline bore of each of the plurality of hub blocks are inline.

A centreline through the flowline bore in each of the plurality of 2-slot inline blocks, a centreline through each of the plurality of flowline spacer pipes, and a centreline through a portion of the flowline at each end of the mud mat may be located in one single plane.

The hub block is preferably a single piece metal block.

Each hub block may further include a flowline alignment geometry surrounding the flowline inlet port and the flowline exit port. The flowline alignment geometry enables the hub block to be aligned with a flowline as an assembly of one or more hub blocks are welded to the flowline. The flowline alignment geometry is typically a recess with an inner diameter corresponding to the outer diameter of the flowline and the valve spacer pipes, and with an annular end face with a height corresponding to the wall thickness of the flowline and the valve spacer pipes, thus providing a smooth inner bore after assembly of the components.

The first valve bore may be perpendicular to the first branch bore, and the second valve bore may be perpendicular to second branch bore.

A 2-slot inline block of the invention comprise a hub block as described above and includes a cut-off valve in each of the first valve bore and the second valve bore.

An assembly of the invention includes a plurality of 2-slot inline block manifolds as described above. Flowline spacer pipes connect and stabilize the inline blocks. A first end of a first flowline spacer pipe of a plurality of flowline valve spacer pipes, is welded to the flowline exit port of a first of the plurality of 2-slot inline block manifolds. A second end of the first flowline spacer pipe is welded to the flowline inlet port of a second of the plurality of 2-slot inline block manifolds.

Furthermore, the invention concerns an inline block manifold system comprising an assembly as described above. Each of the plurality of 2-slot inline blocks is secured to a carrier element forming a centre section of a mud mat whereby the plurality of 2-slot inline blocks are in line with each other. The line of a plurality of 2-slot inline blocks include one 2-slot inline block at a first end of the line and a second 2-slot inline block at a second end of the line. The inlet port of the 2-slot inline block at the first end of the line and the exit port of the 2-slot inline block at the second end of the line are connected to the flowline.

The mud mat may include at least two mud mat parts, each hinged to the carrier element forming the centre section of the mud mat. The mud mat may include an installation configuration where the at least two mud mat parts are folded and each carrier surface defines separate carrier planes, and a deployed configuration where the at least two mud mat parts are unfolded and the two carrier surfaces define a single plane.

When the mud mat parts are unfolded defining a single plane, a set of telescopic arms are extended from the centre part of the inline block manifold system to secure the mud mats in the unfolded position.

The inline block manifold system may further include a flowline stress concentration reducing cocoon connected to each end of the carrier element. A first flowline bend may connect the inlet port of the 2-slot inline block at the first end of the line and the flowline, and a second flowline bend may connect the exit port of the 2-slot inline block at the second end of the line and the flowline.

Furthermore, the invention concerns hub block comprising a first hub configured for connection with a branch pipe from a first well and a second hub configured for connection with a branch pipe from a second well, in line with and in an opposite direction of the first hub. A flowline bore extend between a flowline inlet port and a flowline exit port, intersecting and in fluid connection with a first branch bore extending from the flowline bore and to the first hub and a second branch bore extending from the flowline bore and to the second hub. A first valve bore extend across the first branch bore and a second valve bore extend across the second branch bore.

DETAILED DESCRIPTION

Figure 1:
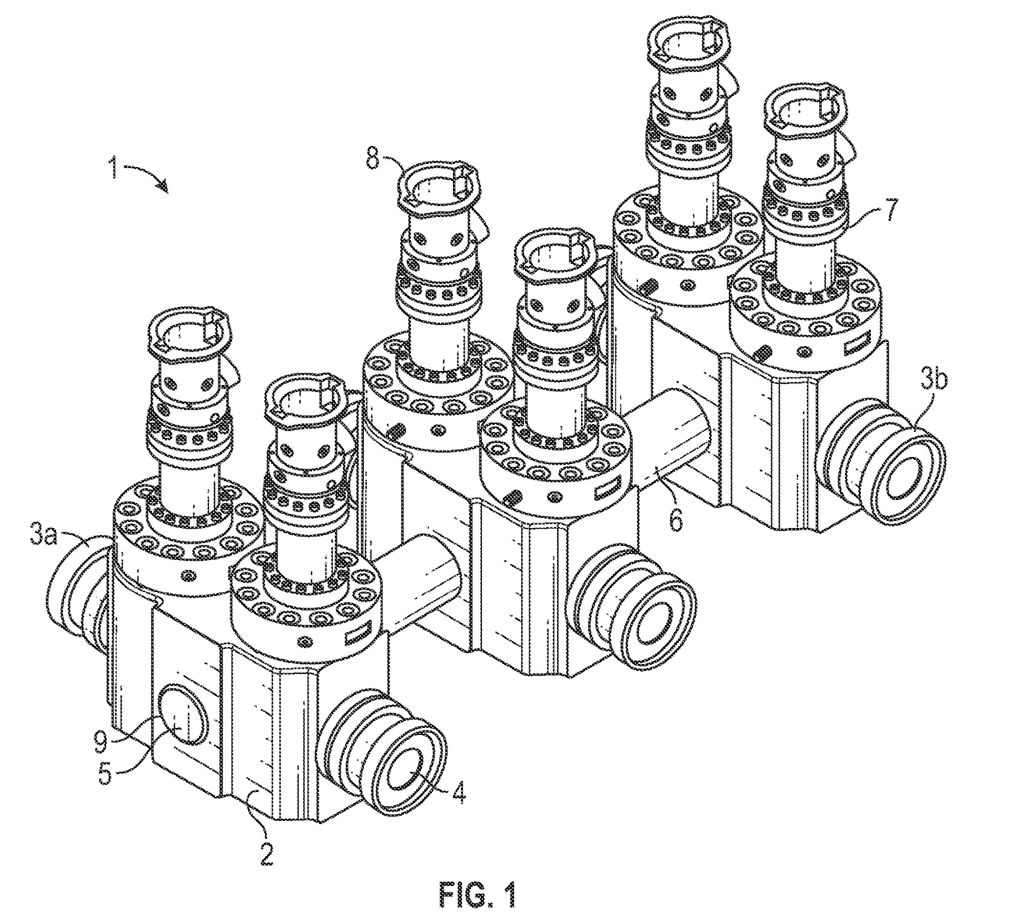
FIG. 1 is a perspective view of three 2-slot inline blocks of the invention.

FIG. 1 shows three 2-slot inline blocks 1 of the invention. The three manifolds 1 are provided to allow six jumpers/branch pipes to be connected to a flowline. The three manifolds 1 are connected with flowline spacer pipes 6 to provide sufficient space between each manifold to allow jumpers to be connected with clamp connectors. The flowline spacer pipes 6 are welded to the manifold housing blocks either onshore in a work shop prior to being shipped out or on a pipe laying ship during pipe laying operations. Two hubs 3a, 3b with jumper/branch ports 4 are integrated in each manifold housing block along with an inlet port 5 aligned with an exit port 10 (at an opposite side of the inlet port 5. The side not shown is a mirror image of the shown side and is thus disclosed). Each jumper port 4 can be closed with a valve 7 with a torque tool bucket 8 allowing a ROV to open or close the valve. Alternatively, the torque tool bucket 8 could be substituted with an integrated, powered actuator. A flowline alignment geometry 9 surrounds the inlet port 5 and the exit port 10 and facilitates alignment of the flowline spacer pipes 6 and a flowline when the hub blocks 1 are installed on a flowline and the flowline and spacers are welded to the hub housing block 2. The flowline alignment geometry 9 is typically a recess with an inner diameter corresponding to the outer diameter of the flowline to avoid a reduction of the flowline inner diameter through the manifold while ensuring proper alignment of the flowlines and to ensure that the flowline not interferes with the bores from the branch ports 4.

Figure 2:
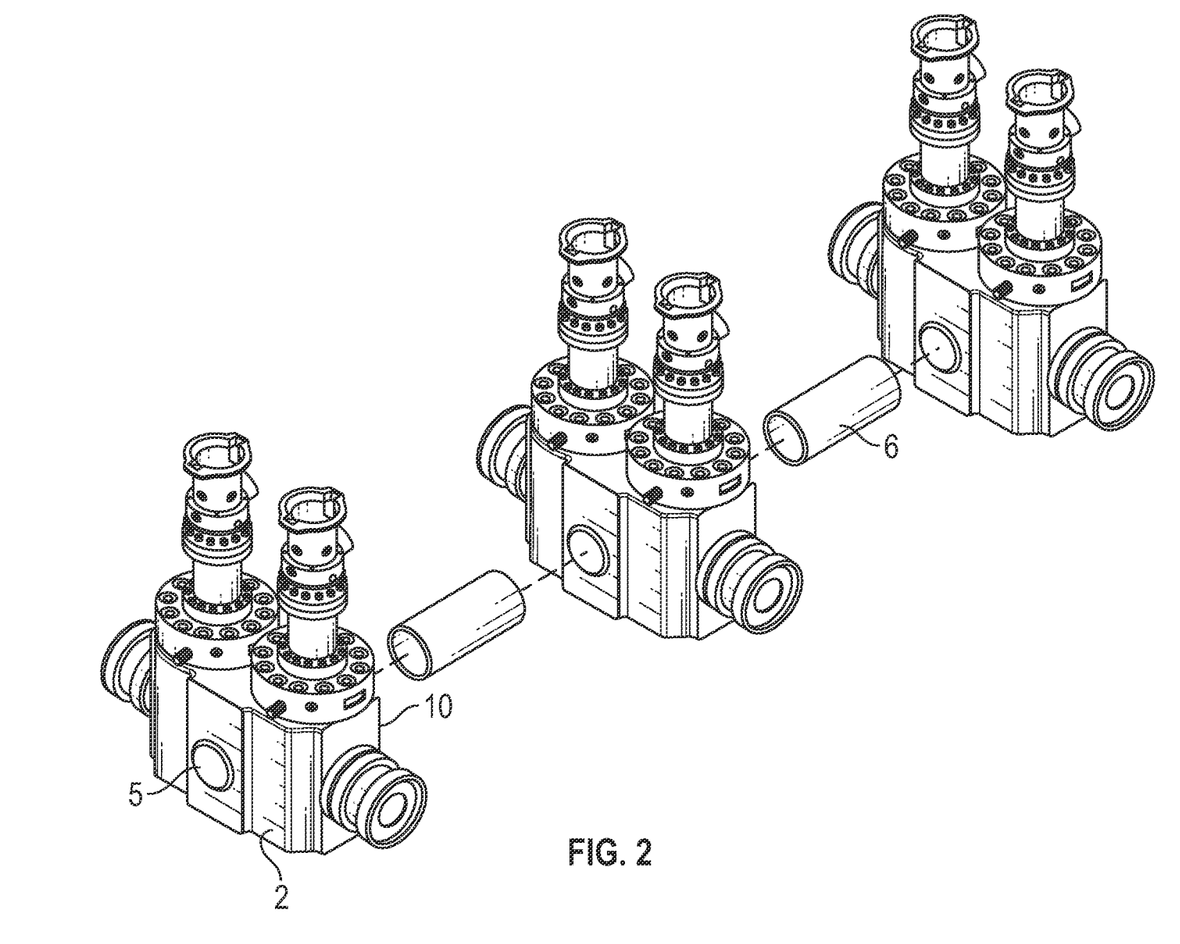
FIG. 2 is a perspective view of the three 2-slot inline blocks of FIG. 1, spaced apart to show flowline spacer pipes.

FIG. 2 corresponds with FIG. 1, and shows the flowline spacer pipes 6 in greater detail. The figures show three 2-slot inline blocks 1, but more than three can easily be implemented. Fewer than three may also be used, but the advantage with the invention is then less prominent.

Figure 3:
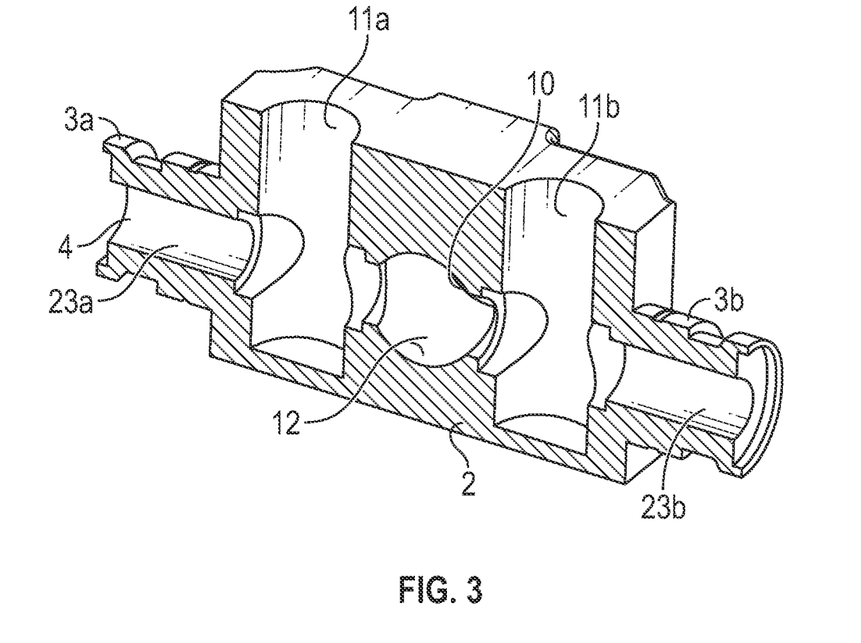
FIG. 3 is a cross section in perspective view of a hub block of the invention.

FIG. 3 is a perspective view of a cut through hub housing block 2 for a manifold of the invention. The hub housing block is machined, cast or printed in one single piece and includes a flowline bore 12, two branch ports 4, two integrated hubs 3a, 3b, and two valve bores 11a, 11b. The hub housing block is typically a single piece steel block. The flowline bore 12 connects the inlet port 5 and the exit port 10 shown on FIG. 2. The two valve bores 11a, 11b intersects the two branch bores 23a, 23b connecting the two branch ports 4 and the flowline bore 12, allowing installation of the cut off valves between the branch ports 4 and the flowline bore 12. The two branch ports 4 are aligned with each other and the two branch bores 23a, 23b meet at the flowline bore 12.

Figure 4:
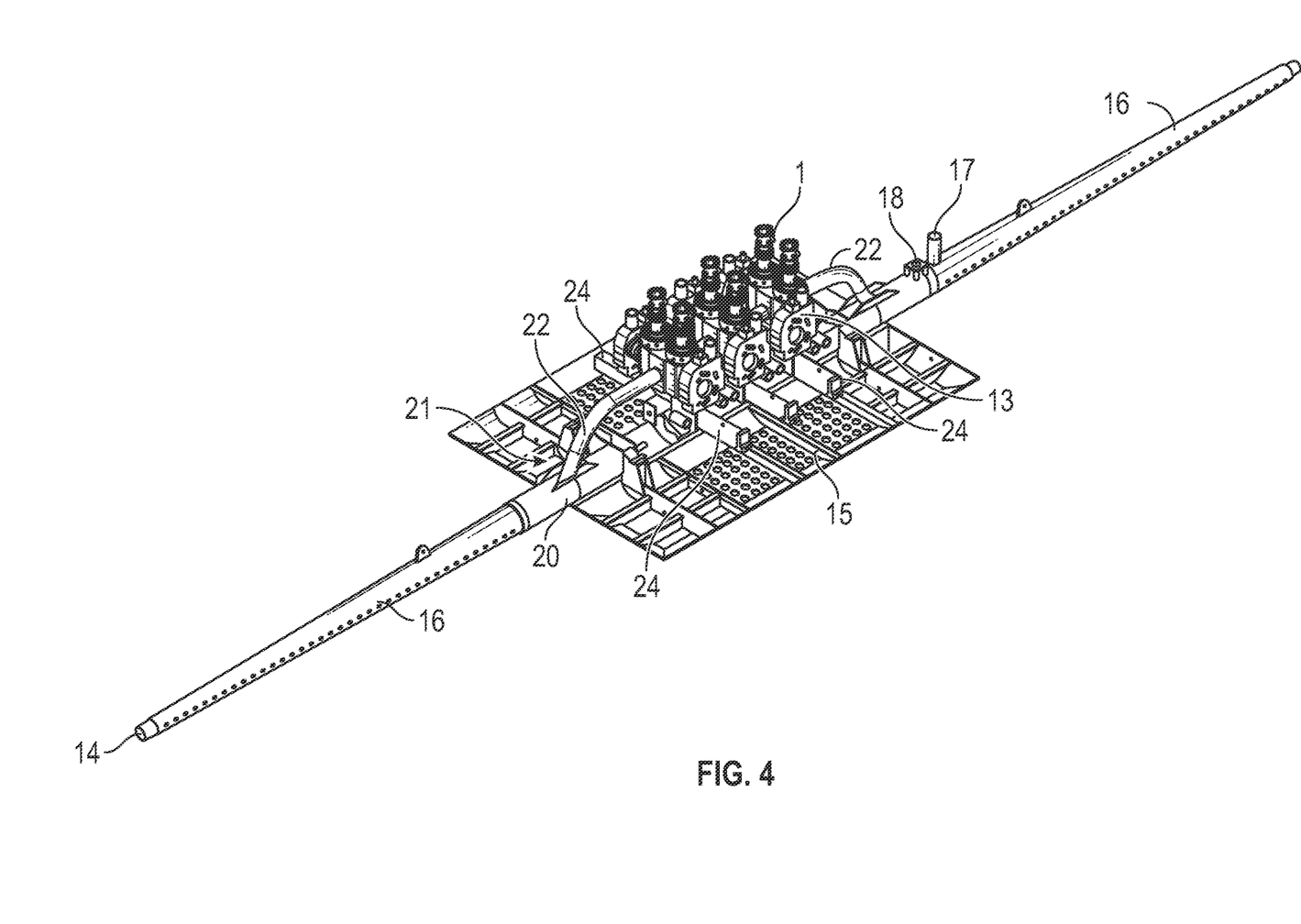
FIG. 4 is a perspective view of an inline block manifold system of the invention.
Figure 5:
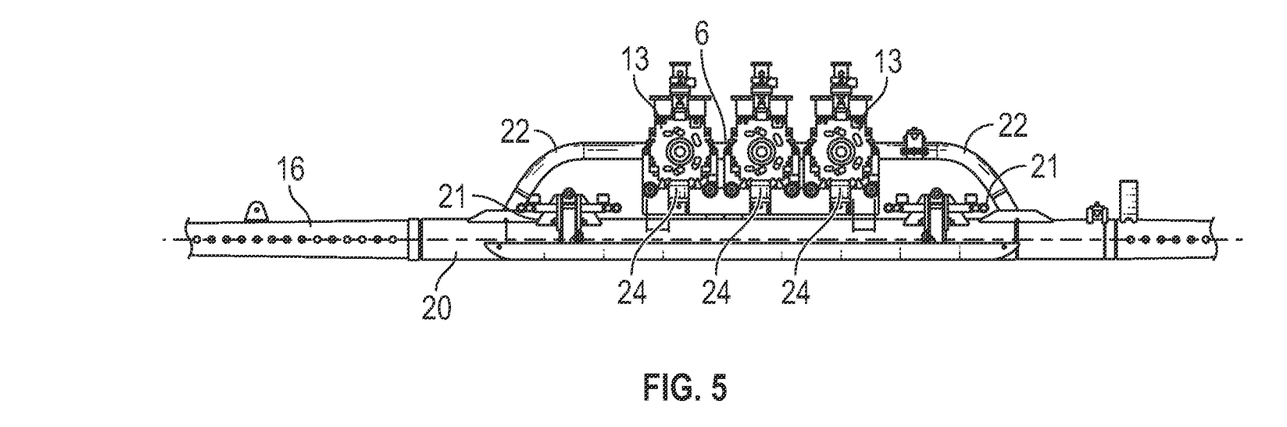
FIG. 5 is a side elevation of the inline block manifold system shown in FIG. 4, in an unfolded operating configuration.

FIGS. 4-8 show three manifolds of FIGS. 1-3 installed on a hinged mud mat 15. In FIG. 4, the mud mat 15 is in a deployed configuration where the at least two mud mat parts are unfolded and each carrier surface define a single plane. This unfolded operating position maintains the inline block manifold system stability while locating the manifolds at a predictable position in relation to the seabed. A telescopic arm 24 below each block is shown in an extended position, and hold the two mud mat parts in the unfolded position. Common linear actuators operated by an ROV, or that are energized by an energy storage in the form of batteries or hydraulic actuators operating electric linear actuators or hydraulic cylinders extend the telescopic arms 24. Wiring can alternatively connect the actuators to a topside. FIGS. 4 and 5 show three telescopic arms 24, but a higher or lower may clearly be used.

The hinged mud mat 15 is secured to the flowline 14 through flowline reducing cocoons 16 at each side, interconnected by a carrier pipe 20. The flowline reducing cocoons 16 are in-line with the carrier pipe 20 while the flowline exits the carrier pipe 20 through two flowline manifold bends 22, connecting the flow line 14 with the manifolds 1. The carrier pipe 20 maintains the axial loads in the flow line 14 and the reducing cocoons 16 distributes the loads on the flowline 14 and prevent stress concentrations and buckling.

Temporary mud mat locking pins 21 are provided to hold the two, hinged mud mat halves of the mud mat 15 in a folded position prior to installation on a seabed. A clamp connector 13 (six in total) is located on each integrated hub 3 to provide a connection for each jumper. During installation a number of telescopic arms 24 perpendicular to the flowline axis are in a retracted position between the upright mud mat elements. When the mud mat is unfolded, the telescopic arms 24 are extended forming a locking mechanism maintaining the mud mat in an unfolded position on the seabed.

A transponder bucket 17 is installed allowing position measurement during and after installation. A ROV remove the instrument after final measurement.

A metrology receptacle is secured to the carrier pipe 20 to be used for jumper metrology.

The flowline bores of the three 2-slot inline blocks 1 are inline and produce a straight flow through the manifold, at least when the valves are closed. The flows from the jumper ports are channeled through the centre of the manifold 1 and further to the flowline 14. Accordingly, the manifolds provide a favourable flow pattern and a low pressure drop across the manifolds. The two flows from the opposing branch ports 4 meet inside the flowline bore of the manifold 1.

FIG. 5 is a view of the three manifolds of FIGS. 1-3 installed on the hinged mud mat from the side. The flowline manifold bends 22 lead the flowline through the carrier pipe 20 and into the manifold system, while the carrier pipe 20 continues in the elongation of the flow line and the reducing cocoons 16. The mud mat halves are held in place in the open, unfolded operating position by suitable locks and the telescopic arms 24. In FIG. 5, the temporary mud mat locking pins 21 are released to allow the two mud mat halves to unfold and to allow the two mud mat halves to define a common plane. Six clamp connectors 13 are located on the integrated hubs to provide a suitable connection with branch pipes/jumpers. Flowline spacer pipes 6 are provided between the manifold blocks.

Figure 6:
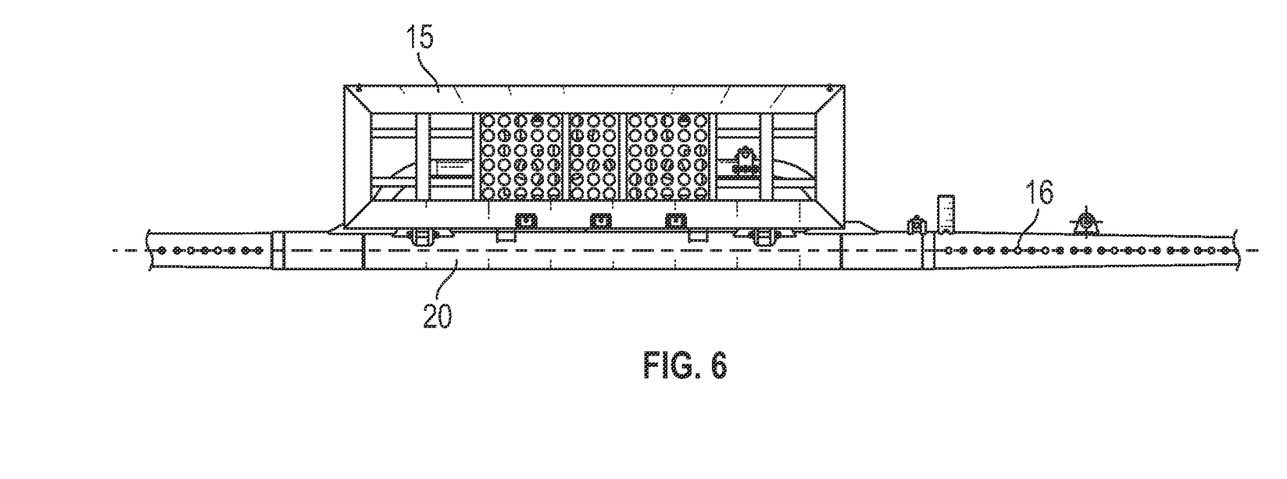
FIG. 6 is a side elevation of the inline block manifold system shown in FIG. 4, in a folded installation configuration.

FIGS. 5 and 6 clearly show three telescopic arms 24 in an extended position. In the extended position, the telescopic arms extend above the two mud mat parts and secure the mud mat in the open, unfolded position. The telescopic arms 24 run in a direction parallel to the mud mat parts when these are unfolded and will also contribute to the unfolding of the two mud mat parts in the event the mud mat parts do not unfold completely under the effect of gravity. The telescopic arms 24 have a length that is less than the width of the complete system of blocks, valves and mud mat when the telescopic arms are in a retracted position, as shown in FIGS. 6, 7 and 8.

Figure 7:
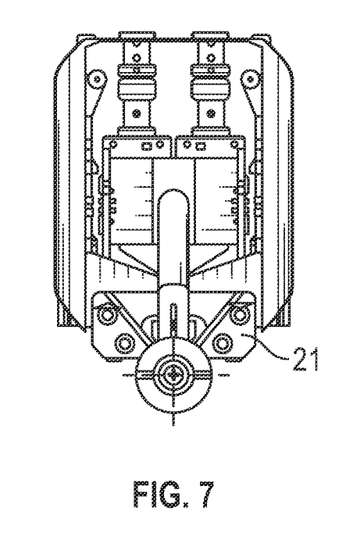
FIG. 7 a front view of the inline block manifold system shown in FIG. 4, in a folded installation configuration.
Figure 8:
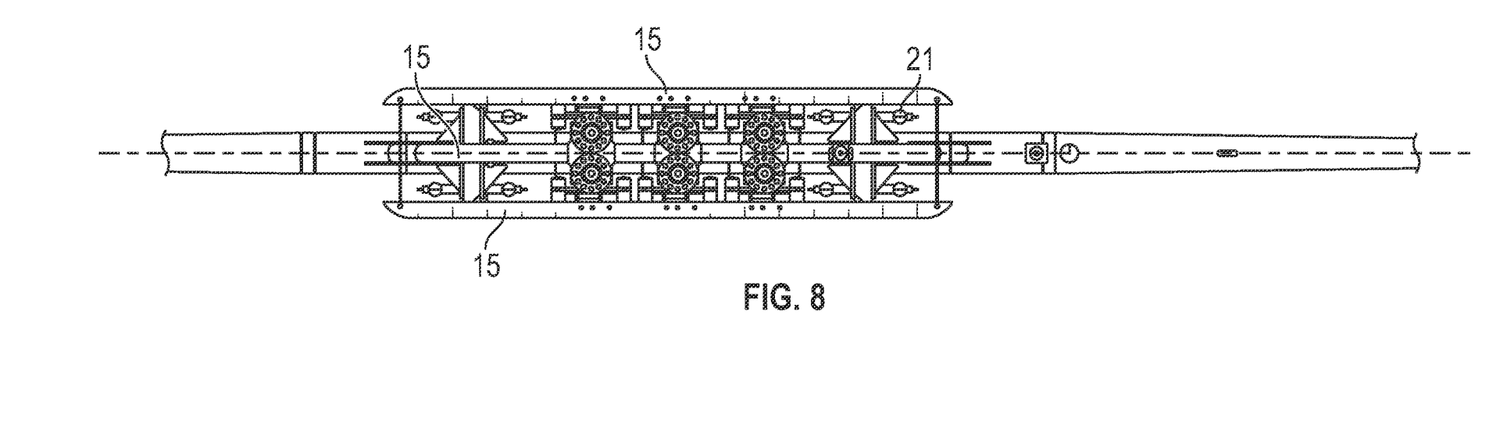
FIG. 8 a top view of the inline block manifold system shown in FIG. 4, in a folded installation configuration.

FIGS. 6-8 correspond to FIGS. 4-5, but show the mud mat 15 in a folded position from the side, from the front, and from above respectively. FIGS. 6-8 represent an installation configuration where the at least two mud mat parts are folded and each carrier surface define separate carrier planes. The telescopic arms 24 are retracted and arranged between the mud mats. The folded position is maintained to allow assembly of the manifolds and the mud mat 15 onto a flowline on a pipe laying ship during pipe laying operations. The width of the assembly is less than a maximum width the pipe laying ship allows. The assembly may be installed on the pipeline during ordinary pipe laying operation without stopping the pipe laying ship. The cocoons 16 and the carrier pipe 20 also facilitates the assembly on the flowline assembly line. The locking pins 21 maintains the two halves of the mud mat 15 in the folded position. From FIGS. 7 and 8 it is clear how the flowline, the flowline valve bends 22, the flowline valve spacer pipes, and the manifold housing block flowline bore are located in the same plane. The centre lines in FIGS. 6 and 8 and a vertical line through the centre of FIG. 7 can define this plane.

The configuration of the manifolds in line with each other, and with the jumpers entering the manifold from two opposite directions into the flow line, enables a plurality of manifolds to be installed in-line without any practical limit in the number of manifolds. The distance between each manifold is only limited by the size of the clamp connectors, and the allowable length of each section on the pipe laying ship. This results in a compact and flexible manifold configuration.

The invention claimed is:

1. An inline block manifold system including a plurality of hub blocks (2) connected by a plurality of flowline spacer pipes, each comprising:
   a first hub (3a) connected to one of the plurality of flowline spacer pipes and comprising a first branch port configured for connection with a branch pipe from a first well and a second hub (3b) connected to another of the plurality of flowline spacer pipes comprising a second branch port, configured for connection with a branch pipe from a second well, wherein the second hub (3b) is in line with and in an opposite direction of the first hub (3a);
   a flowline bore (12), extending between a flowline inlet port (5) and a flowline exit port (10), intersecting and in fluid connection with a first branch bore (23a) extending from the flowline bore (12) and to the first hub (3a) and a second branch bore (23b) extending from the flowline bore (12) and to the second hub (3b);
   a first valve bore (11a) extending across the first branch bore (23a); and
   a second valve bore (11b) extending across the second branch bore (23b); and
   wherein the flowline bore (12) of each of the plurality of hub blocks (2) are inline.

2. The inline block manifold system of claim 1, wherein a centreline through the flowline bore (12) in each of the plurality of 2-slot inline blocks (1), and a centreline through each of the plurality of flowline spacer pipes (6), are in one single plane.

3. The inline block manifold system of claim 1 wherein each hub block (2), is made of one single block of metal.

4. The inline block manifold system of claim 1 wherein each hub block (2), further include a flowline alignment geometry (9) surrounding the flowline inlet port (5) and the flowline exit port (10), whereby a flowline is aligned with the hub block (2) while the flowline is welded to the hub block (2).

5. The inline block manifold system of claim 1 wherein, in each of the hub blocks (1), the first valve bore (11a) is perpendicular to the first branch bore (23a); and
   the second valve bore (11b) is perpendicular to second branch bore (23b).

6. The inline block manifold system of claim 1, further including a cut-off valve (7) in each of the first valve bore (11a) and the second valve bore (11b).

7. The inline block manifold system of claim 6,
   wherein a first end of a first flowline spacer pipe (6) of a plurality of flowline spacer pipes (6) is welded to the flowline exit port (10) of a first of the plurality of 2-slot inline blocks (1); and
   a second end of the first flowline spacer pipe (6) is welded to the flowline inlet port (5) of a second of the plurality of 2-slot inline blocks (1).

8. The inline block manifold system of claim 7, wherein each of the plurality of 2-slot inline blocks (1) is secured to a carrier element (20) forming a centre section of a mud mat (15) whereby the plurality of 2-slot inline blocks (1) are in line with each other and include one 2-slot inline block (1) at a first end of the line and a second 2-slot inline block (1) at a second end of the line;
   wherein the inlet port (5) of the 2-slot inline block (1) at the first end of the line and the flowline exit port (10) of the 2-slot inline block (1) at the second end of the line are in fluid connection with the flowline bore (12).

9. The inline block manifold system of claim 8, wherein the mud mat (15) includes at least two mud mat parts, each hinged to the carrier element (20) forming the centre section of the mud mat (15), the at least two mud mat parts including an associated carrier surface,
   wherein the mud mat (15) includes an installation configuration where the at least two mud mat parts are folded and each carrier surface define separate carrier planes; and
   wherein the mud mat (15) includes a deployed configuration where the at least two mud mat parts are unfolded and each carrier surface define a single plane, and wherein the mud mat (15) includes a number of telescopic arms (24) retractable for installation and extendable for stabilising the mud mat (15) when the mud mat (15) is unfolded.

10. The inline block manifold system of claim 8, further including a flowline (20) stress concentration reducing cocoon (16) connected to each end of the carrier element (20), wherein a first flowline bend (22) connects the inlet port (5) of the 2-slot inline block (1) at the first end of the line and the flowline; and wherein a second flowline bend (22) connects the flow line exit port of (10) of the 2-slot inline block (1) at the second end of the line and the flowline bore (12).

11. A hub block (2) comprising a first hub (3a) connected to one of a plurality of flowline spacer pipes and comprising a first branch port configured for connection with a branch pipe from a first well and a second hub (3b) connected to another of the plurality of flowline spacer pipes comprising a second branch port configured for connection with a branch pipe from a second well, wherein the second hub (3b) is in line with and in an opposite direction of the first hub (3a);

a flowline bore (12), extending between a flowline inlet port (5) and a flowline exit port (10), intersecting and in fluid connection with a first branch bore (23a) extending from the flowline bore (12) and to the first hub (3a) and a second branch bore (23b) extending from the flowline bore (12) and to the second hub (3b), a first valve bore (11a) extending across the first branch bore (23a); and a second valve bore (11b) extending across the second branch bore (23b).

* * * * *